United States Patent [19]
Engel

[11] Patent Number: 5,888,284
[45] Date of Patent: Mar. 30, 1999

[54] WATER-BASED INKS AND INK SETS AND USE THEREOF

[75] Inventor: Stefan Engel, Nürnberg, Germany

[73] Assignee: J. S. Staedtler GmbH & Co., Nürnberg, Germany

[21] Appl. No.: 891,664

[22] Filed: Jul. 11, 1997

[30] Foreign Application Priority Data

Jul. 12, 1996 [DE] Germany .................. 196 28 209.8

[51] Int. Cl.$^6$ .................................................. C09D 11/02
[52] U.S. Cl. ...................................... 106/31.27; 106/31.43; 106/31.58
[58] Field of Search ................. 106/31.27, 31.43, 106/31.58

[56] References Cited

U.S. PATENT DOCUMENTS

| | | | |
|---|---|---|---|
| 3,994,736 | 11/1976 | Hertz et al. ........................ | 106/31.58 |
| 5,135,571 | 8/1992 | Shirota et al. ..................... | 106/31.51 |
| 5,143,547 | 9/1992 | Kappele ............................ | 106/31.58 |
| 5,145,519 | 9/1992 | Kappele ............................ | 106/31.58 |
| 5,273,573 | 12/1993 | Kappele ............................ | 106/31.27 |
| 5,679,140 | 10/1997 | McInerney et al. ................ | 106/31.27 |
| 5,749,951 | 5/1998 | Yoshiike et al. ................... | 106/31.27 |

FOREIGN PATENT DOCUMENTS

| | | |
|---|---|---|
| 0 526 731 | 2/1993 | European Pat. Off. . |
| 0 345 763 | 6/1993 | European Pat. Off. . |

*Primary Examiner*—Helene Klemanski
*Attorney, Agent, or Firm*—Kenyon & Kenyon

[57] ABSTRACT

An ink set (TS) containing of a plurality of inks (T1, T2, T3, T4, T . . . ) of various ink colors, containing at least one red or magenta-colored ink, one blue or cyan-colored ink and one yellow ink plus optionally also a black ink, in particular for use in ink jet printers, where each ink (T1, T . . . ) contains at least one soluble dyestuff (FS1, FS . . . ) as the essential coloring agent (FM) and water (W) and/or organic solvent as the main solvent (LM) and one or more drying retardants (TV) and optionally preservative(s) (KM) and/or other additives (Z1, Z2, Z3, Z4, Z . . . ).

22 Claims, No Drawings

WATER-BASED INKS AND INK SETS AND USE THEREOF

BACKGROUND OF THE INVENTION

1. Field of the Invention

The invention concerns water-based inks and ink sets and use thereof for writing, drawing, painting, printing and specifically also for ink jet printing and other machine writing, printing, painting or labeling processes, where the inks are preferably applied to coated media.

2. Description of Related Art

In principle, such inks and ink sets are known, e.g., for ink jet printers. For example, European Patent No. 526 731 B1 describes an ink jet ink set with red (magenta), blue (cyan) and yellow ink for use in ink jet printers.

In this process, 1.75% to 4% dyestuffs selected from the following groups are added to a vehicle consisting of 5% to 11% glycols and/or glycol ethers and water: Reactive Red 180, Acid Red 52, Acid Yellow 23 and/or Acid Blue 9.

One disadvantage of this process in particular is that whether mixed or used individually, these inks and their impressions do not have good lightfastness or uniform, i.e., equal, rates of fading.

European Patent No. 0 345 763 B1 discloses printing ink solutions that are said to yield especially bright, lightfast, and moisture-resistant impressions. These printing ink solutions, which are to be used in particular to produce magenta or blue ink, essentially contain at least two different dyestuffs. Each of these dyestuffs is produced or formulated according to specific requirements, and at least one other dyestuff (according to C.I.=Color Index) is a dyestuff to be selected from the group: Acid Red 131, Acid Red 274, Direct Red 227, Direct Red 9, Direct Yellow 86, Direct Yellow 142, Direct Blue 199, Direct Blue 86 and/or Acid Blue 198. The proposed dyestuffs should be dissolved or dispersed in a liquid medium, where the solvent should include a polyhydric alcohol or an aliphatic monohydric alcohol.

A disadvantage of these printing ink solutions is that one of the dyestuffs contained in each ink is not a conventional commercial product and therefore is not readily available. Furthermore, a plurality of dyestuffs mixed together are always required, so that, first, it is not necessarily always possible to manufacture inks and, second, they are very expensive. Furthermore, it is not readily apparent how the individual inks of a complete ink set consisting of at least three different ink colors can or should be prepared, or whether or how it is possible to guarantee good lightfastness and relatively uniform color constancy even with mixed colors.

In addition, there are known pigment inks with a relatively high lightfastness on the market, but they sediment readily and do not have a long shelf life and they also frequently cause blockage of extremely fine capillaries and nozzles of the reservoirs and/or printing wicks or ink jet heads. Such pigment inks have previously been considered the most lightfast inks of all, and it seemed practically impossible or extremely difficult to obtain comparable good values with dyestuff inks.

SUMMARY OF THE INVENTION

The object of this invention is to create inks and ink sets with soluble dyes that do not have the above-mentioned disadvantages and therefore can be produced relatively easily and inexpensively, do not clog fine nozzles or capillaries and have a long shelf life and furthermore can be produced relatively easily in the three primary colors blue or cyan, red or magenta and yellow and optionally also black, and whose impressions have a high lightfastness with approximately equal fade rates both directly and also in the mixed colors prepared from them.

In addition, such inks and their impressions should also be moisture-resistant and weatherproof, possibly even on coated printing and writing media that are to be used preferably outdoors.

These and other objects of the invention are achieved by an ink set (TS) containing a plurality of inks (T1, T2, T3, T4, T . . . ) of various ink colors, containing at least one red or magenta-colored ink, one blue or cyan-colored ink and one yellow ink plus optionally also a black ink, in particular for use in ink jet printers, where each ink (T1, T . . . ) contains at least one soluble dyestuff (FS1, FS . . . ) as the essential coloring agent (FM) and water (W) and/or organic solvent as the main solvent (LM) and one or more drying retardants (TV) and optionally preservative(s) (KM) and/or other additives (Z1, Z2, Z3, Z4, Z . . . ).

The inks (T1, T2, T3, T4, T . . . ) contain at least one dyestuff (FS1, FS . . . ) that is soluble in water or in an organic solvent (LM) as the essential coloring agent (FM), and the dyestuff (FS) or the coloring agent (FM) should have a lightfastness of greater than or equal to 5, preferably 6 or 7, against the blue wool scale. In particular, a first ink (T1) should also contain Direct Blue 199 (FS1), a second ink (T2) should contain Reactive Red 23 (FS2), a third ink (T3) should contain Reactive Yellow 37 (FS3) and optionally a fourth ink should also contain Solubilized Sulfur Black 1 (FS4) as the predominant or main dyestuff (FS . . . ). In addition, each ink (T1, T2, T3, T4, T . . . ) should also contain glycerol (G) as a drying retardant (TV) and optionally also triethanolamine and/or other additives (Z2, Z3, Z4, Z . . . ).

DETAILED DESCRIPTION OF THE INVENTION

This invention is illustrated in greater detail below on the basis of some examples of ink.

EXAMPLE 1

(skeleton example)

70 to 95 wt % water (W) as the solvent (LM)
0.5 to 20 wt % glycerol (G) used as a drying retarder (TV)
1 to 25 wt % dyestuff (FS) used as the coloring agent (FM)
0.1 to 1 wt % preservative (KM)
0.1 to 5 wt % other additives plus optionally
0 to 2 wt % triethanolamine (TEA) to adjust the pH

EXAMPLE 2

(blue ink/cyan) (T1)

5 wt % glycerol (G),
3 wt % Direct Blue 199 used as dyestuff (FS1),
0.7 wt % triethanolamine (TEA)
0.2 wt % preservative (KM)
balance = water (W)

EXAMPLE 3
(red ink/magenta) (T2)

---
5 wt % glycerol (G)
2 wt % Reactive Red 23 used as dyestuff (FS2)
1.5 wt % triethanolamine (TEA)
0.2 wt % preservative (KM)
balance = water (W)

---

EXAMPLE 4
(yellow ink) (T3)

---
5 wt % glycerol (G)
5 wt % Reactive Yellow 37 used as dyestuff (FS3)
0.7 wt % triethanolamine (TEA)
0.2 wt % preservative (KM)
balance = water (W)

---

EXAMPLE 5
(black ink) (T4)

---
5 wt % glycerol (G)
20 wt % Solubilized Sulfur Black 1 used as dyestuff (FS4)
0.2 wt % preservative (KM)
balance = water (W) as solvent (LM)

---

EXAMPLE 6
Ink set (TS1)

An ink set (TS1) consisting of blue (cyan), red (magenta) and yellow ink has one ink from each of the preceding Examples 2, 3 and 4.

EXAMPLE 7
Ink set (TS2)

An ink set (TS2) consisting of blue (cyan), red (magenta), yellow and black ink has one ink from each of the preceding Examples 2, 3, 4 and 5.

These water-based inks are suitable for writing, drawing, painting, printing and in particular for ink jet printing or other printing or labeling processes.

EXAMPLE 8
Ink set (TS3)

An ink set (TS3) consisting of blue (cyan), red (magenta), yellow and optionally black ink has a first ink (T5) Solvent Blue 70 (FS5), a second ink (T6) Solvent Red 122 (FS6), as third ink (T7) Solvent Yellow 82 (FS7) and optionally a fourth ink (T8) Solvent Black 27 (FS8), each as the exclusive dyestuff or a the main or predominant dyestuff (FS), where the respective dyestuff (FS5, FS6, FS7, FS8) is previously dissolved in an alcoholic solvent or an organic solvent LM2.

Alcoholic or organic solvents LM2 may include, for example, ethanol, ethyl glycol, diethylene glycol, methoxypropanol, ethoxypropanol, methyl ethyl ketone or ethyl acetate, where the dyestuff here can or should also be in the form of a liquid dyestuff dissolved in the solvent (LM2) with a 2% to 50% dyestuff content, preferably before being added to the ink.

To prevent flocculation, the solvent LM may be an all-organic or all-alcoholic solvent LM2.

These inks containing alcohol-soluble dyestuffs and organic solvents are also very suitable for writing, drawing, painting, printing and in particular also for ink jet printing or other printing or labeling processes, preferably also on smooth surfaces.

A proposed ink set TS consisting essentially of several inks T1, T2, T3, T . . . of various ink colors and has at least one red or magenta-colored ink, one blue or cyan-colored ink and one yellow ink. In addition, it may also contain a black ink. Such ink sets TS should be provided in particular for use in ink jet printers and plotters. Each ink T1, T2, T3, T . . . should contain at least one soluble dyestuff FS as the essential coloring agent FM, and a solvent LM plus one or more drying retardants TV and optionally preservative(s) KM and/or other additives Z1, Z2, Z3, Z4, Z . . . . According to this invention, the solvent LM should be essentially water W or an organic solvent LM2, inks T1, T2, T3, T . . . should contain at least one water-soluble dyestuff FS1, FS2, FS3, FS4 or an alcohol-soluble dyestuff FS5, FS6, FS7, FS8 as the essential and preferably as the exclusive coloring agent (FM), where the essential coloring agent FM or the main dyestuff FS has a lightfastness of greater than or equal to 5, preferably 6 or 7, against a blue wool scale, where the method of determining the lightfastness here is performed with the help of a lightfastness scale from 1 (low) to 8 (excellent), as also described and explained in DIN 54,004 (August 1983 edition) pages 1 and 2. Xenon arc light is used for this test.

According to another idea of this invention, a first ink set TS1 should contain a first ink T1 with Direct Blue 199 as FS1, a second ink T2 with Reactive Red 23 as FS2 and a third ink T3 with Reactive Yellow 37 as FS3, each as the exclusive or as the predominant or main dyestuff FS.

A second ink set TS2 should contain a first ink T1 with Direct Blue 199 as FS1, a second ink T2 with Reactive Red 23 as FS2, a third ink T3 with Reactive Yellow 37 as FS3 and a fourth ink T4 with Solubilized Sulfur Black 1 as FS4, each as the exclusive or as the predominant or main dyestuff FS. A third ink set TS3 should contain a first ink T5 with Solvent Blue 70 as FS5, a second ink T6 with Solvent Red 122 as FS6, a third ink T7 with Solvent Yellow 82 as FS7 and optionally a fourth ink T8 with Solvent Black 27 [as] FS8, each as the exclusive dyestuff FS or as the predominant or main dyestuff FS, and the respective dyestuff FS5, FS6, FS7, FS8 should be first dissolved in an alcoholic solvent or another organic solvent LM2.

Alcoholic or organic solvents LM2 may be, for example, ethanol, ethyl glycol, diethylene glycol, methoxypropanol, ethoxypropanol, methyl-ethyl ketone or ethyl acetate, where the dyestuff here is preferably also a liquid dyestuff dissolved in solvent LM2 with a 2% to 50% dyestuff content before addition to the ink and the solvent may be of an alcoholic type or some other organic type.

In particular, to adjust the drying rate of the impression and the danger of drying up in the printer or recording device, it is possible to add glycerol G as the (perhaps essential) drying retardant TV to the ink set TS or to each ink T1, T2, T3, T4, T . . . and possibly also to add triethanolamine to adjust the pH and/or other additives Z2, Z3, Z4, Z . . . , preferably in an amount of 0.5 to 20 wt %.

When using ink jet systems or in similar equipment such as plotters, it is especially advantageous if the coloring agent FM is essentially salt-free. This is then of course also true of all other components of the inks.

For a simple production, it is advantageous if the coloring agent FM is in the form of a liquid dyestuff even before processing, preferably having a dyestuff content of 2% to 50%, where the vehicle substance here may be water and/or an alcoholic solvent or some other organic solvent LM2, depending on the type of dyestuff.

Each ink set TS or each ink T2, T3, T4, T . . . may also advantageously contain triethanolamine TEA as an additional additive ZS; likewise, surfactants T, preservatives KM and/or anticorrosion agent(s) AKM as the other additive Z3, Z4, Z4.

The surfactant T used may preferably be a fatty alcohol polyglycol ether, and the preservative KM may be a solution of isothiazolinone derivatives such as 5-chloro-2-methyl-3-(2h)-isothiazolone, 2-methyl-3-(2h)-isothiazolone, 12-hydroxy-5,8,11-trioxadodecane, 1,3-bis(hydroxymethyl) urea and 1,6-dihydroxy-2,5-dioxahexane.

As an alternative, however, solutions of O- and N-acetals, halogenated acid amide derivatives and/or N,S-heterocyclic compounds may also be used. It may optionally also be advantageous if the ink set TS or each ink T2, T3, T4, T . . . contains emulsifiers E, surfactants T, preservatives KM and optionally other additives ZS in a total amount of 0.5–5 wt %.

In preferred mixtures, an ink set TS or each individual ink T1, T2, T3, T4, T . . . should contain 1–25 wt % dyestuff FS1, FS2, FS3, FS4, FS . . . as the coloring agent (FM), 70–95 wt % water W as solvent LM, 0.5 to 20 wt % glycerol G as drying retardant TV and 0.1 to 5 wt % other additives Z2, Z3, Z4, Z . . .

Accordingly, in a first ink set TS1, a first ink T1 contains 3 wt % dyestuff FS1 as coloring agent FM, 5 wt % glycerol G as a drying retardant, 0.2 wt % preservative KM, 0.7 wt % triethanolamine (Z2) and the balance=water W as solvent LM, where dyestuff FS1 is Direct Blue 199 in particular.

A second ink T2 is composed of 2 wt % dyestuff FS2 as coloring agent FM, 5 wt % glycerol G as drying retardant, 0.2 wt % preservative KM, 1.5 wt % triethanolamine (Z2) and the balance=water W as solvent LM, where dyestuff FS2 is Reactive Red 23 in particular.

A third ink T3 contains 5 wt % dyestuff FS3 as coloring agent FM, 5 wt % glycerol G as drying retardant, 0.2 wt % preservative KM, 0.7 wt % triethanolamine TEA and the balance=water W as solvent LM, where dyestuff FS3 is Reactive Yellow 37 in particular.

According to a preferred embodiment, if ink set TS also contains a fourth ink T4, the latter consists of 20 wt % dyestuff FS4 as coloring agent FM, 5 wt % glycerol G as drying retardant TV, 0.2 wt % preservative KM and the balance=water W as the main solvent LM, where dyestuff FS4 is Solubilized Sulfur Black 1 in particular.

It has proven to be especially advantageous to use a proposed ink set TS, TS1, TS2 consisting of a plurality of inks T1, T2, T3, T4, T . . . and/or at least one ink T1, T . . . as described and claimed in an ink jet printer or plotter process, preferably on coated printing media, in particular on coated paper, textile fabric, film, fiber nonwoven, etc., where a mineral coating such as silicic acid and/or a synthetic resin or shellac coating that is water soluble in the basic pH range is preferred.

The inks according to this proposal are characterized in particular by the high lightfastness of the impressions made from them, by problem-free use and simple production as well as by their long shelf life under all conditions. Furthermore, they are surprisingly more lightfast than pigment systems in the case of yellow and magenta. Another advantage is that all the colors fade to the same extent, i.e., they have an approximately uniform degree of fading. With the proposed ink sets TS which contain at least inks T1, T2 and T3 with the different colors red (magenta), blue (cyan) and yellow, all other important colors can be produced as mixed colors in ink jet printers or plotters in particular. Black is preferably provided as a separate ink T4, but it may optionally also be prepared as a mixed color.

For "brightening" or achieving other effects, other system-compatible dyestuffs may also be added.

The ink sets of the invention may be used in an ink jet printing process, preferably on a coated printing medium, in particular on coated paper, textile fabric, film, fiber nonwoven, and the like, where a mineral coating such as silicic acid and/or a synthetic resin or shellac coating that is water-soluble in the basic pH range is used.

What is claimed is:

1. An ink set (TS) comprising a plurality of inks (T1, T2, T3, T . . . ) of various ink colors containing at least one red or magenta-colored ink, one blue or cyan-colored ink and one yellow ink, where each ink contains at least one soluble dyestuff (FS) as an essential coloring agent (FM) and solvent (LM) plus a drying retardant (TV), wherein the solvent (LM) is essentially water (W) or an organic solvent (LM2), the inks (T1, T2, T3, T . . . ) contain at least one water-soluble dyestuff (FS1, FS2, FS3, FS4) as a predominant dyestuff (FS) or an alcohol-soluble dyestuff (FS5, FS6, FS7, FS8) as the essential coloring agent (FM), and the essential coloring agent (FM) or the predominant dyestuff (FS) has a lightfastness of greater than or equal to 5, against a blue wool scale.

2. The ink set according to claim 1, wherein said lightfastness is 6 or 7.

3. The ink set according to claim 1, wherein the ink set (TS1) contains a first ink (T1) with Direct Blue 199 (FS1), a second ink (T2) with Reactive Red 23 (FS2) and a third ink (T3) with Reactive Yellow 37 (FS3), each as the predominant dyestuff (FS) or as an exclusive dyestuff (FS).

4. The ink set according to claim 1, wherein the ink set (TS2) contains a first ink (T1) with Direct Blue 199 (FS1), a second ink (T2) with Reactive Red 23 (FS2), a third ink (T3) with Reactive Yellow 37 (FS3) and a fourth ink (T4) with Solubilized Sulfur Black 1 (FS4), each as the predominant dyestuff (FS) or as an exclusive dyestuff (FS).

5. The ink set according to claim 1, wherein the ink set (TS3) contains a first ink (T5) with Solvent Blue 70 (FS5), a second ink (T6) with Solvent Red 122 (FS6), a third ink (T7) with Solvent Yellow 82 (FS7), each as the predominant dyestuff (FS) or as an exclusive dyestuff (FS), and the respective dyestuff (FS5, FS6, FS7) is present in previously dissolved form in an organic solvent.

6. The ink set according to claim 5, further comprising a fourth ink (T8) with solvent black 27 (FS8), and the respective dyestuff (FS5, FS6, FS7, FS8) is present in previously dissolved form in an alcoholic solvent.

7. The ink set according to claim 1, wherein each ink (T1, T2, T3, T4, T . . . ) contains glycerol (G) as a drying retardant (TV).

8. The ink set according to claim 7, wherein each ink contains triethanolamine.

9. The ink set according to claim 7, wherein each ink (T1, T2, T3, T4, T . . . ) contains 0.5 to 20 wt % glycerol (G).

10. The ink set according to claim 1, wherein the coloring agent (FM) is essentially salt-free.

11. The ink set according to claim 1, wherein the coloring agent (FM) is present as a liquid dyestuff with a dyestuff content of 2% to 50% before processing, where the vehicle substance is water, alcohol or another organic solvent.

12. The ink set according to claim 1, wherein the inks (T2, T3, T4, T . . . ) contain triethanolamine (TEA) as an additional additive (ZS).

13. The ink set according to claim 1, wherein the inks (T1, T2, T3, T4, T . . . ) contain a surfactant (T), a preservative (KM) or an anticorrosion agent (AKM) as an additional additive (ZS).

14. The ink set according to claim 1, wherein the inks (T1, T2, T3, T4, T . . . ) contain fatty alcohol polyglycol ether as another additive or as a surfactant (T).

15. The ink set according to claim 1, wherein the inks contain a solution of isothiazolinone derivative as a preservative (KM).

16. The ink set according to claim 1, wherein the inks contain solution of O- and N-acetals, halogenated acid amide derivatives or N-, S-heterocyclic compounds as a preservative (KM).

17. The ink set according to claim 1, wherein the inks (T1, T2, T3, T4, T . . . ) contain 0.5–3.5 wt % emulsifier (E), surfactant (T) and preservative (KM).

18. The ink set according to claim 1, wherein the inks (T1, T2, T3, T4, T . . . ) each contain:

1 to 25 wt % dyestuff (FS1, FS2, FS3, FS4, FS . . . ) as the coloring agent (FM), 70 to 90 wt % water (W) as the solvent (LM), 0.5 to 20 wt % glycerol (G) as the drying retardant (TV) and 0.1 to 5 wt % other additives (Z2, Z3, Z4, Z . . . ).

19. The ink set according to claim 1, wherein a first ink (T1) contains 3 wt % dyestuff (FS1) as the coloring agent (FM), 5 wt % glycerol (G) as the drying retardant, 0.2 wt % preservative (KM), 0.7 wt % triethanolamine (Z2) and balance=water (W) as the solvent (LM), where the dyestuff (FS1) is a Direct Blue 199 dyestuff.

20. The ink set according to claim 1, wherein a second ink (T2) contains 2 wt % dyestuff (FS2) as the coloring agent (FM), 5 wt % glycerol (G) as the drying retardant, 0.2 wt % preservative (KM), 1.5 wt % triethanolamine (Z2) and balance=water (W) as the solvent (LM), where the dyestuff (FS2) is a Reactive Red 23 dyestuff.

21. The ink set according to claim 1, wherein a third ink (T3) contains 5 wt % dyestuff (FS3) as the coloring agent (FM), 5 wt % glycerol (G) as the drying retardant, 0.2 wt % preservative (KM), 0.7 wt % triethanolamine (Z2) and balance=water (W) as the solvent (LM), where the dyestuff (FS3) is a Reactive Yellow 37 dyestuff.

22. The ink set according to claim 1, wherein a fourth ink (T4) contains 20 wt % dyestuff (FS4) as the coloring agent (FM), 5 wt % glycerol (G) as the drying retardant (TV), 0.2 wt % preservative (KM) and balance=water (W) as the main solvent (LM), where the dyestuff (FS4) is a Solubilized Sulfur Black 1 dyestuff.

* * * * *